Nov. 28, 1944.  K. KARISH  2,363,869

WOODWORKING MACHINE ATTACHMENT

Filed June 24, 1943  2 Sheets-Sheet 1

INVENTOR.
KARL KARISH
BY John J. Lynch
atty.

INVENTOR.
KARL KARISH

Patented Nov. 28, 1944

2,363,869

UNITED STATES PATENT OFFICE 2,363,869

WOODWORKING MACHINE ATTACHMENT

Karl Karish, Brooklyn, N. Y.

Application June 24, 1943, Serial No. 492,034

3 Claims. (Cl. 142—1)

This invention relates to wood-working machines and in particular to attachments that can be employed for other operations than the one for which the machine was originally designed.

A particular object of my invention is to make it possible to do wood turning on a table top machine and without requiring the skill of a craftsman known in the trade as a wood turner. Another object of the invention is to arrange the parts of the attachment so that they can be quickly and safely operated to turn out a large amount of work with a minimum of effort and time and to provide an inexpensive attachment that can be quickly removed when it is desired to use the main part of the machine for other wood working operations.

My invention consists of a work holder that clamps the work in place and permits it to be advanced to the cutter and thereafter turned to produce the finished effect, manual as well as automatic means being provided for turning the work so that skilled labor may be dispensed with in producing the more simple forms of turned objects.

Figures 1, 2:
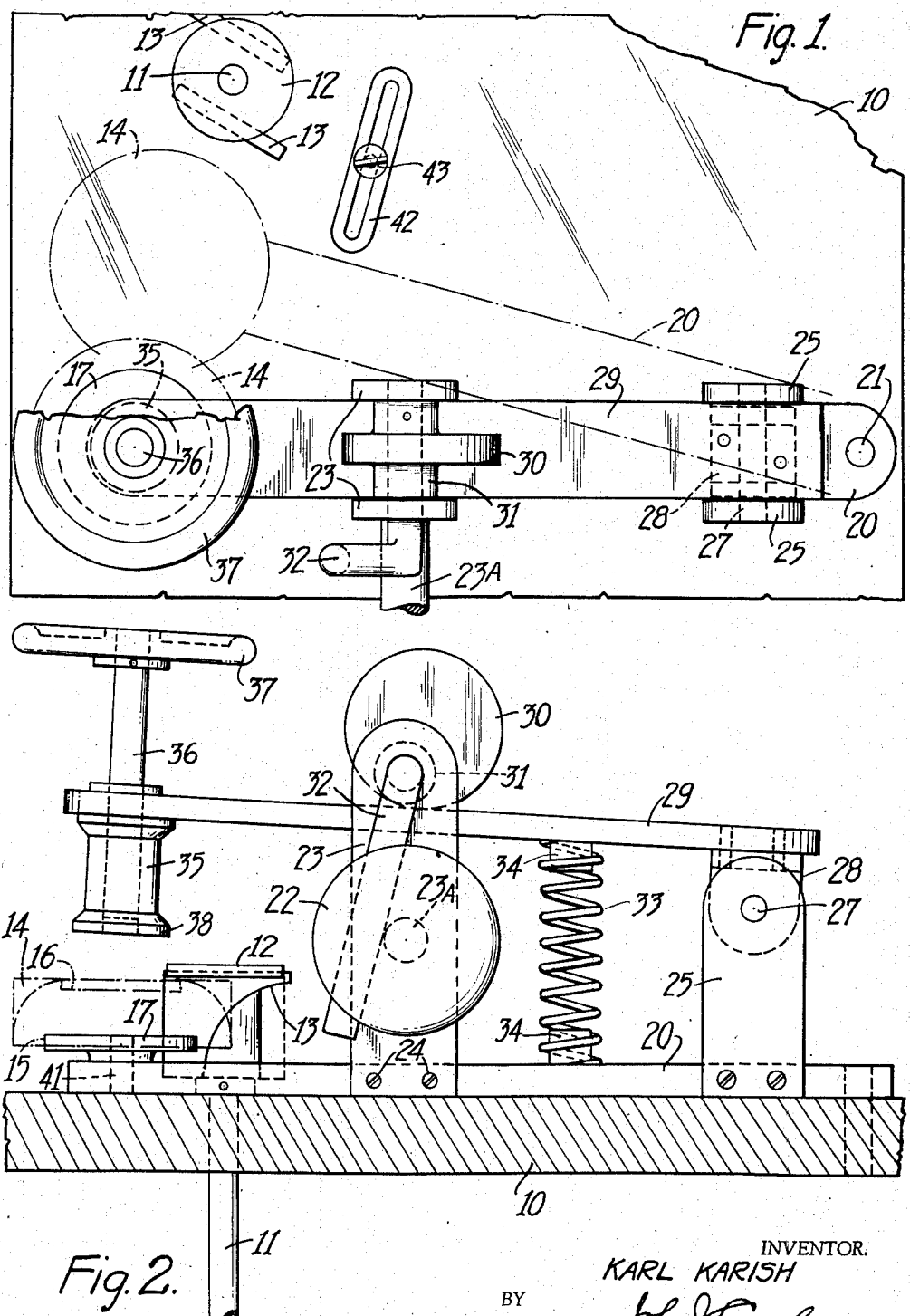
Figure 3:
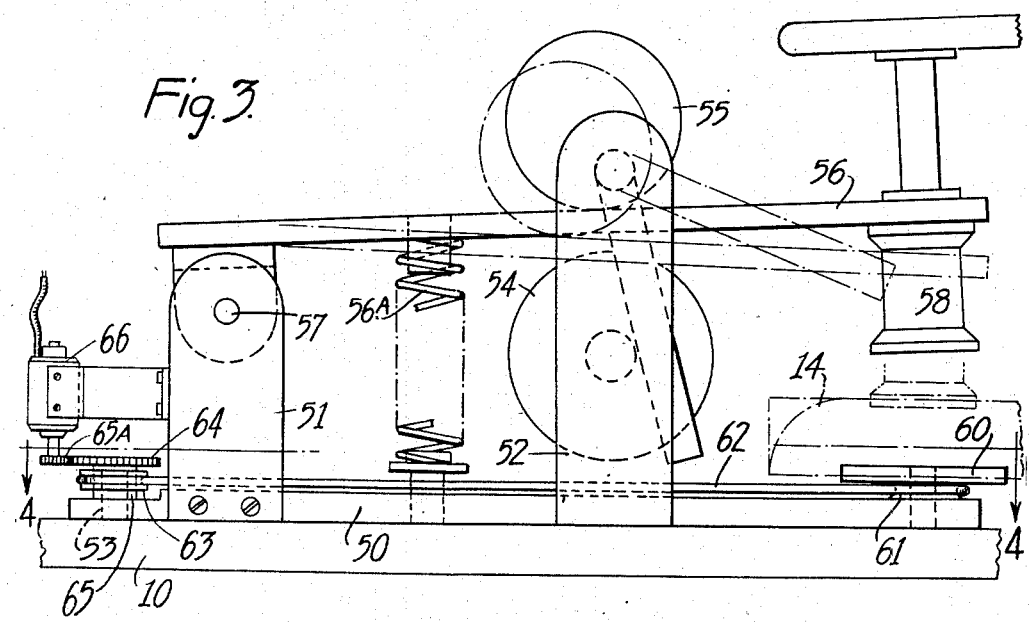
Figure 4:
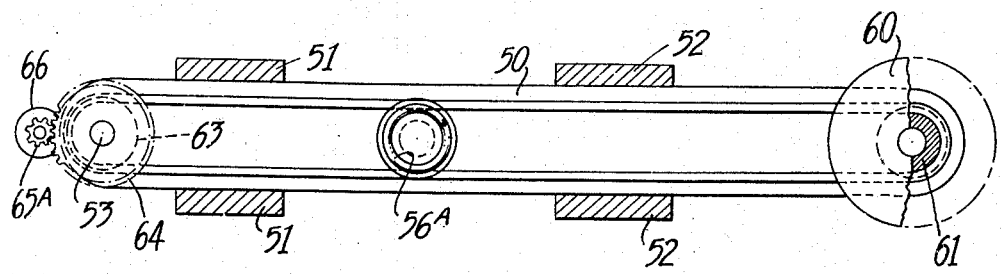
Figure 5:
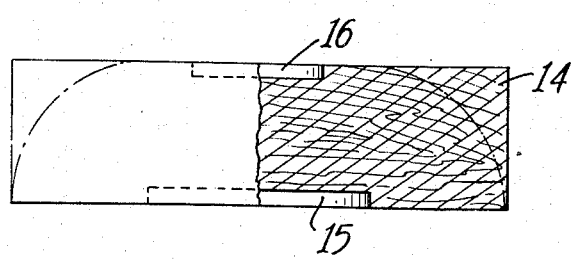

Other objects and structural features of the invention will be apparent from the following description when read in connection with the accompanying drawings, wherein:

Figure 1 is a plan view of the attachment shown mounted on a machine table in proper relation to the cutter, Figure 2 is a side view in elevation of the attachment as seen in Figure 1, showing the device in the work receiving position, the work being indicated in outline, Figure 3 is a view similar to Figure 2 taken from the opposite side of the device and showing a power driven means for actuating the work, the work and work clamping position of the parts being indicated in outline, Figure 4 is a section in plan taken on the line 4—4 of Figure 3 showing the arrangement of the drive means for operating the work in turning movement, and Figure 5 is a side view of one type of work piece, part being shown in section, that can be produced on my improved attachment.

Referring to the drawings in detail, a table top portion 10 of a woodworking machine equipped with a vertical power shaft 11 is illustrated, the upper end of the shaft where it protrudes through the table 10 being arranged to carry a tool holder 12 in which one or more wood turning cutters 13 can be secured in the well known manner. The shaft 11 is driven at high speed by a motor (not shown) and, as work is turned against the cutters, any desired contour of edge may be turned on the work 14. The latter in this instance, which is solely illustrative, consists of a disk which has been precut to provide a seat recess 15 and a clamp recess 16 so that as the work is placed in position on a work holding disk 17, it will fit closely thereover and be prevented from having lateral movement relatively to said disk. The recess 16 receives the clamping means and through the medium thereof is revolved against the cutters.

It is evident that in the wood working trade there are wood machines that have flat topped tables and vertical drive shafts and to this type of machine, I apply an attachment for wood turning that can be readily set up and removed so that the machine can be employed for other purposes. To this end my invention consists of a work carrier having an elongated base strip 20 pivoted as at 21 to the top 10 of the table and arranged to be swung toward and away from the cutters 13 through the medium of a handle 22 formed on the end of a rod 23A secured in one of two upright guide pieces 23 which are secured as by screws 24 to the bottom or base strip 20. Similar members as the pieces 23 are arranged near the pivot point of strip 20 and constitute journal posts 25 secured by screws to said strip 20 and supporting between them the pivot pin 27 upon which is mounted an inverted U-shaped bearing 28 suitably secured to the underside of a clamp arm 29.

The arm 29, extending between the guides 23 is arranged to be swung up and down about its pivot point 27 by the action of an eccentric disk 30 formed integral with a sleeve 31 which is secured to a handle 32 extending through the guides 23 and resting against the rod 23A when the clamp is in "open" position. The open position of the clamp is maintained by the spring 33, disposed between the strip 20 and arm 29, and held in position by dowel studs 34.

The outer or free end of the clamp arm 29 carries a clamping stud 35 attached to a handwheel shaft 36 which passes through the arm 29 and carries at its upper end a handwheel 37. The latter, upon being manually revolved, turns the stud 35, whose flanged lower end 38 seats in the recess 16 when the clamp is "closed" by the turning action of the eccentric under influence of its handle 32.

The clamp stud 35 is aligned with the work carrying disk 17 which is rotatably mounted on pin 41 secured in the outer or free end of the base 20, over which fits the work 14, so that the seat recess 15 of the latter is engaged by the disk. The work is secured firmly in place and the carrier as a unit is swung about its pivot point 21 until the tool bites into the work and until the edge of the base 20 engages the end of an adjustable stop 42 which is secured to the table 10 through the medium of a bolt and slot connection 43. The latter provides for the adjustment of work of varying sizes relatively to the cutters. When the base has engaged the stop, the work is turned by manual twisting of the handwheel 37 until the work has been completely turned down to shape.

As illustrated in Figures 3 and 4, the form of the invention is similar in major detail but is adapted to the use of a motor or other power means for turning the work. The base 50 provided with two sets of posts 51 and 52, the latter serving as guides, is pivoted on the pin 53 for horizontal swinging movement to bring the work 14 into contact with the cutters (not shown) when the carrier is pushed through manual force against the handle 54 carried by one of the posts 52 which carries the eccentric 55 for operation of the clamp arm 56, yieldably maintained in "open" position by spring 56A, about its pivot 57 in arms or posts 51. In this instance, the work is engaged by the clamp stud 58 which is revolvably carried in the end of the clamp arm 56. The work 14 is mounted on a disk 60 about whose flanged belt groove 61 operates a belt 62 driven from a pulley 63 integral with a gear 64 and sleeve 65 journalled on the pivot pin 53. The gear 64 and its driving pinion 65 constitute a speed reduction drive from the motor 66 so that the work is turned slowly, say from two to four revolutions per minute. With this arrangement, it is simply necessary for the unskilled operator to place the work in the carrier and actuate the eccentric to close the clamp on the work as indicated in outline in Figure 3 and push the work against the stop and the cutter and the motor driven work turning means will complete the operation without danger to the operator and in a minimum amount of time. Consequently with the use of my improved and novel device, unskilled labor may be employed in the turning of wood objects that heretofore required a lathe and the services of an operator known in the trade as a "turner."

While one form of work has been illustrated, it is evident that many varied forms may be turned by changing cutting tools to bring out the desired contour.

While I have described what I consider to be a highly desirable embodiment of my invention, it is obvious that many changes in form could be made without departing from the spirit of my invention, and I therefore do not limit myself to the exact form herein shown and described nor to anything less than the whole of my invention as hereinbefore set forth, and as hereinafter claimed.

What I claim as new and desire to secure by Letters Patent is:

1. A wood turning attachment for woodworking machines comprising a base pivoted at one end to a table top of the machine, a work carrier at the opposite end of the base comprising a revolvable disk, a clamp bar pivoted to said base, an eccentric for engaging the bar for moving it to clamping position, revolvable means on the bar for holding the work on the disk, means for yieldably resisting the movement of the bar to clamping position, and a stop for limiting the pivotal movement of the base.

2. A wood turning unit for use with a machine having a table and a power operated cutter associated with the table, said unit comprising upper and lower pieces hinged together to provide a work holding clamp between the ends thereof, one end of the lower piece being pivotally connected to the table, a drive pulley adjacent the pivoted end of the lower piece, means for actuating said drive pulley, a grooved disk at the other end of said lower piece for holding work to be secured by the clamp action of said upper and lower pieces, means for forcing the upper piece down to complete clamping action and a drive belt connecting said pulley with said grooved disk whereby the latter rotates the work.

3. A wood turning unit for use with a woodworking machine having a table top and a power operated cutter associated with said top, said unit comprising upper and lower hinged arms constituting a work holding clamp, one end of the lower arm being pivoted to said table top and carrying a belt pulley, power means for operating said pulley, a disk at the opposite end of said pivoted arm, a belt connecting the disk with said pulley for rotating work supported on the disk, means for securing work on the disk including an eccentric for moving the upper member to clamping position, means for swinging the unit about its pivot to bring the work against the cutter and a stop for limiting the pivotal movement of said unit in a direction toward the cutter.

KARL KARISH.